United States Patent
Viljoen et al.

(10) Patent No.: US 7,496,956 B1
(45) Date of Patent: Feb. 24, 2009

(54) FORWARD APPLICATION COMPATIBLE FIREWALL

(75) Inventors: Pieter Viljoen, Marina Del Rey, CA (US); Gregory D. Vogel, Chatsworth, CA (US)

(73) Assignee: Symantec Corporation, Cupertino, CA (US)

( * ) Notice: Subject to any disclaimer, the term of this patent is extended or adjusted under 35 U.S.C. 154(b) by 675 days.

(21) Appl. No.: 11/030,390

(22) Filed: Jan. 5, 2005

(51) Int. Cl.
*G06F 21/00* (2006.01)

(52) U.S. Cl. ............................ 726/11; 713/188; 709/244
(58) Field of Classification Search ................... 726/11, 726/14, 26; 713/153–154, 188; 709/238, 709/244; 705/79
See application file for complete search history.

(56) References Cited

U.S. PATENT DOCUMENTS

| | | | | |
|---|---|---|---|---|
| 5,944,821 | A * | 8/1999 | Angelo | 726/22 |
| 6,766,314 | B2 * | 7/2004 | Burnett | 707/2 |
| 7,143,113 | B2 * | 11/2006 | Radatti | 707/200 |
| 2002/0099952 | A1 * | 7/2002 | Lambert et al. | 713/200 |
| 2003/0120935 | A1 * | 6/2003 | Teal et al. | 713/188 |
| 2003/0149887 | A1 * | 8/2003 | Yadav | 713/200 |
| 2003/0167402 | A1 * | 9/2003 | Stolfo et al. | 713/200 |
| 2004/0078591 | A1 * | 4/2004 | Teixeira et al. | 713/201 |
| 2004/0107360 | A1 * | 6/2004 | Herrmann et al. | 713/201 |
| 2004/0133548 | A1 * | 7/2004 | Fielding et al. | 707/1 |
| 2004/0268124 | A1 * | 12/2004 | Narayanan | 713/164 |
| 2006/0206943 | A1 * | 9/2006 | Ellison et al. | 726/26 |
| 2007/0204154 | A1 * | 8/2007 | Swander et al. | 713/166 |

OTHER PUBLICATIONS

White Paper: Application Firewalls, F5 Networks, Inc., Oct. 2004, 7 pages, [online] [Retrieved on Apr. 26, 2005] Retrieved from the Internet <URL:http://www.f5.com/solutions/tech/asg.html>.
Rudis, B. et al., The Enemy Within: Firewalls And Backdoors, [online] [Retrieved on Apr. 26, 2005] Retrieved from the Internet <URL:http:www.securityfocus.com/infocus/1701>.
Firewalls, updated Feb. 19, 2004, 6 pages, [online] [Retrieved on Apr. 26, 2005] Retrieved from the Internet <URL:http://www.wilders.org/firewalls_m.htm>.

* cited by examiner

*Primary Examiner*—Minh Dieu Nguyen
(74) *Attorney, Agent, or Firm*—Fenwick & West LLP

(57) ABSTRACT

A security server distributes security polices to the client computers. Each security policy includes an identifier identifying the process to which the policy pertains, and security rules for use with that process. The identifier includes a version hash and a code hash. The version hash of a process is likely to remain unchanged if the process is modified by a legitimate agent, such as by a software update. The code hash of a process is likely to change if the process is modified by a malicious agent. When a process executing on the client computer requests access to a resource, the client computer generates a version hash of the process and uses it to identify the security policy pertaining to the process. If the version hash matches a version hash in a security policy, but the code hash does not match, the client computer declares the process potentially malicious.

17 Claims, 5 Drawing Sheets

FORWARD APPLICATION COMPATIBLE FIREWALL

CROSS-REFERENCE TO RELATED APPLICATION

This application is related to U.S. patent application Ser. No. 10/211,827, filed Aug. 2, 2002 and incorporated by reference herein.

BACKGROUND OF THE INVENTION

1. Field of the Invention

This invention pertains in general to computer network security, and in particular to network firewalls.

2. Description of the Related Art

Private networks, such as those operated by businesses or other enterprises are often connected a public network such as the Internet. The private networks typically include a firewall positioned at the intersection of the private and public networks. The firewall monitors traffic passing between the networks and blocks unauthorized and/or malicious traffic. The firewall thus prevents malicious entities on the public network from accessing the resources of the private network, and prevents entities on the private network from accessing unauthorized resources of the public network.

A more recent trend in network security is to run so-called "personal firewalls" on the computer systems used by the end-users to access the network. For example, the desktop computer utilized by an employee of an enterprise can run a personal firewall. The personal firewall monitors network activity to/from the computer and blocks malicious traffic.

An advantage of a personal firewall is that it can apply a different security policy to each process executing on the computer. When a personal firewall is first installed on a computer, the personal firewall typically detects each attempt by a process to access the network. With each attempt, the firewall presents a dialog box to the end-user saying something to the effect of "Process X has attempted to access the Internet. Allow it to proceed?" The end-user responds to the dialog box by indicating whether the firewall should allow or block the network access. The personal firewall remembers the end-user's choices and applies the same security policy next time the process attempts to access the network.

A problem with relying on end-users to establish security policies is that the end-users are often not sophisticated enough to evaluate the security threat posed by a given process. A typical end-user might not have any idea whether a process should be allowed to access the network. Some personal firewalls attempt to solve this problem by including additional information in the dialog box, such as the destination address and/or protocol of the access request. However, this additional information often serves to further confuse the end-user. Another problem with this approach is that the personal firewall will remember and continue to apply the end-user's decision, even if it was incorrect.

Therefore, attempts have been made to provide greater intelligence to the personal firewall and remove or reduce its reliance on the end-user. In one personal firewall system, a team of security engineers employed, for example, by the manufacturer of the firewall analyzes popular and common processes to determine the processes' network usage characteristics. The engineers develop security policies based on the processes' characteristics, and these policies are distributed to the personal firewalls "in the field."

The personal firewalls attempt to identify a particular process seeking to access the network, and apply a corresponding security policy developed by the engineers. However, it is often difficult to positively identify a process that is requesting network access. Certain characteristics of processes, such as the name and file size, can easily be spoofed by malicious software. Therefore, the personal firewalls must include a more reliable way to match a requesting process with its correct security policy.

This latter problem is especially difficult because even legitimate processes change frequently. Processes are often patched, upgraded, or otherwise modified either automatically or manually. These changes can occur so frequently that the engineering team cannot keep up. Therefore, there is a need for a way to reliably identify a process and match it with a corresponding security policy.

BRIEF SUMMARY OF THE INVENTION

The above need is met by using an intelligent hashing function to identify the process. In one embodiment, a security server distributes security polices to the client computers. Each security policy includes an identifier that identifies the particular process to which the policy pertains, and a set of security rules designed to be utilized with that process. The identifier is generated using the intelligent hashing function and includes a version hash and a code hash. The version hash of a process is likely to remain unchanged if the process is modified by a legitimate agent, such as by a software update. The code hash of a process is likely to change if the process is modified by a malicious agent.

In one embodiment, a client computer stores the security policies in a policy database. When a process executing on the client computer requests access to a resource, the client computer generates a version hash and code hash of the process. The client computer searches the database to find a security policy having a matching version hash. If the code hash also matches, the client computer applies the security rules in the policy to the process. If the version hash matches, but the code hash does not match, the client computer declares the process potentially malicious. If the version hash does not match the version hash of any security policy, the client computer uses secondary techniques to identify the security policy applicable to the process.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
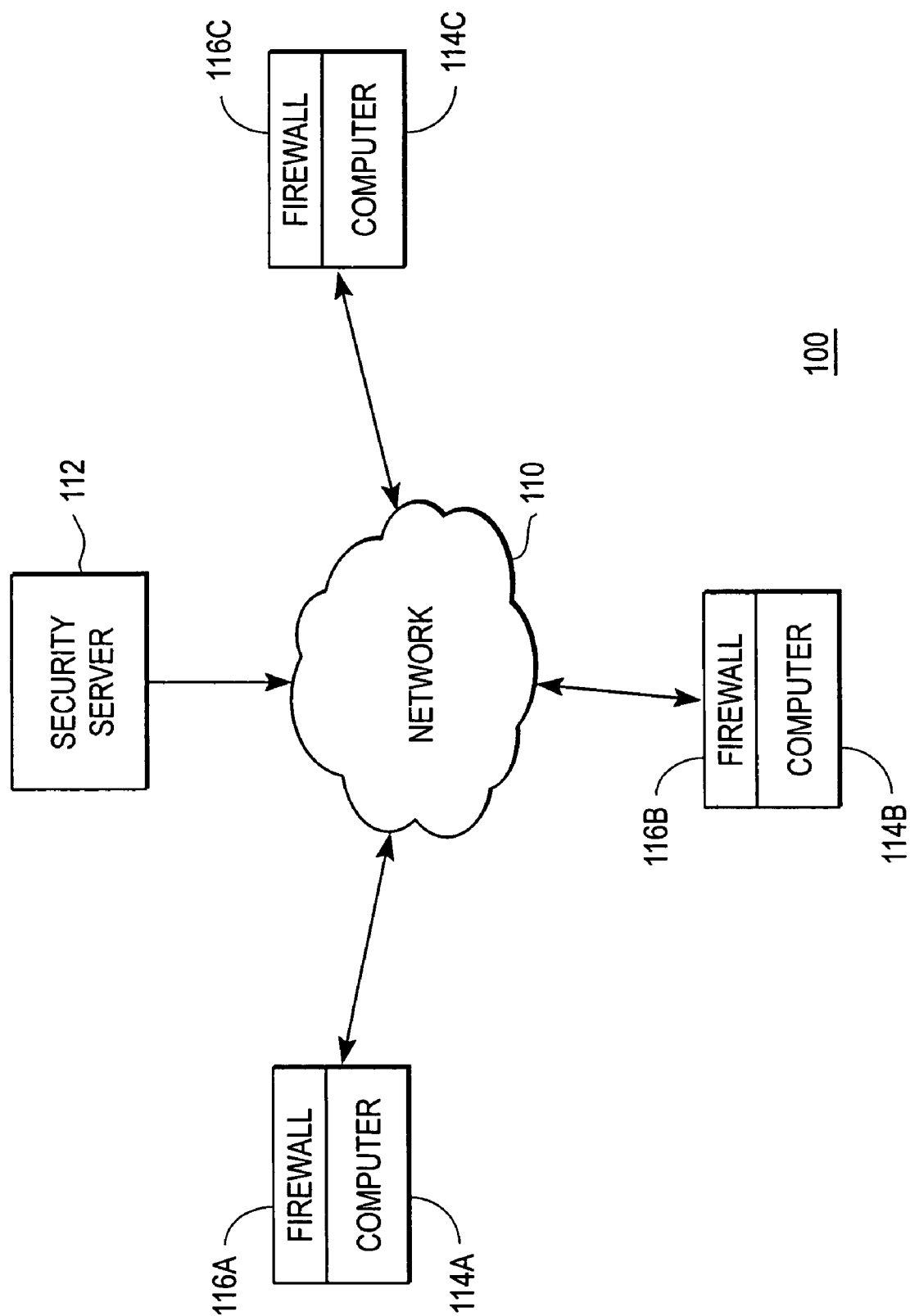
FIG. 1 is a high-level block diagram of an environment utilizing personal firewalls.

FIG. 1 is a high-level block diagram of an environment 100 utilizing personal firewalls according to one embodiment.

The environment 100 includes a network 110 connected to a security provider 112 and to three client computers 114. Only three client computers 114 are shown in FIG. 1 for purposes of clarity, but those of skill in the art will recognize that typical environments can have hundreds or thousands of client computers 114, and can also have multiple security providers. Although not shown in FIG. 1, there can be many other computers connected to the network 110.

FIG. 1 and the other figures use like reference numerals to identify like elements. A letter after a reference numeral, such as "114A," indicates that the text refers specifically to the element having that particular reference numeral. A reference numeral in the text without a following letter, such as "114," refers to any or all of the elements in the figures bearing that reference numeral (e.g. "114" in the text refers to reference numerals "114A," "114B," and/or "114C" in the figures).

The network 110 enables data communication between and among the entities connected to the network and in one embodiment is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, 802.11, integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one embodiment, the security server 112 is a computer system utilized by a provider of security software to distribute software and/or data to client computers 114. In one embodiment, the security provider distributes security software through multiple distribution points, such as retail and online stores. The security software contains functionality to contact the security server 112 and download new and/or updated software and data.

In one embodiment, the security server 112 distributes security polices to the client computers 114. Each security policy includes an identifier that identifies the particular process to which the policy pertains, and a set of security rules designed to be utilized with that process. The security provider can use numerous techniques to develop the security policies. In one embodiment, the security provider utilizes a team of people and/or computers who analyze common and/or popular software applications. The team uses an intelligent hash function, described below, to generate the identifiers for the processes launched by the applications. In addition, the team analyzes the behaviors of the processes to ascertain their correct behaviors, and develops security rules that give the processes only the rights they need to run properly.

The client computers 114 are utilized by end-users to execute software processes and perform a multitude of tasks. For example, the client computers 114 can be utilized by employees of a business to create documents, browse the World Wide Web, exchange messages with other end-users, etc. As is known in the art, the client computers 114 store and execute one or more software applications (also referred to as "programs"). An executing instance of an application is referred to herein as a "process." A single application can spawn multiple processes when it is executed.

Each client computer 114 includes a firewall 116. In one embodiment, the firewall 116 is a so-called personal firewall and is comprised of a software application executed by the computer 114. In other embodiments, the firewall 116 can include a hardware component in addition to, or instead of, the software application. In yet other embodiments, a client 114 lacks a firewall 116 and the functionality ascribed to the firewall herein is provided by another client module. The firewall 116 applies security rules to processes executing on the computer 114. In one embodiment, the firewall 116 uses the intelligent hash function and identifiers to identify processes and then applies the rules from the corresponding security policies.

Figure 2:
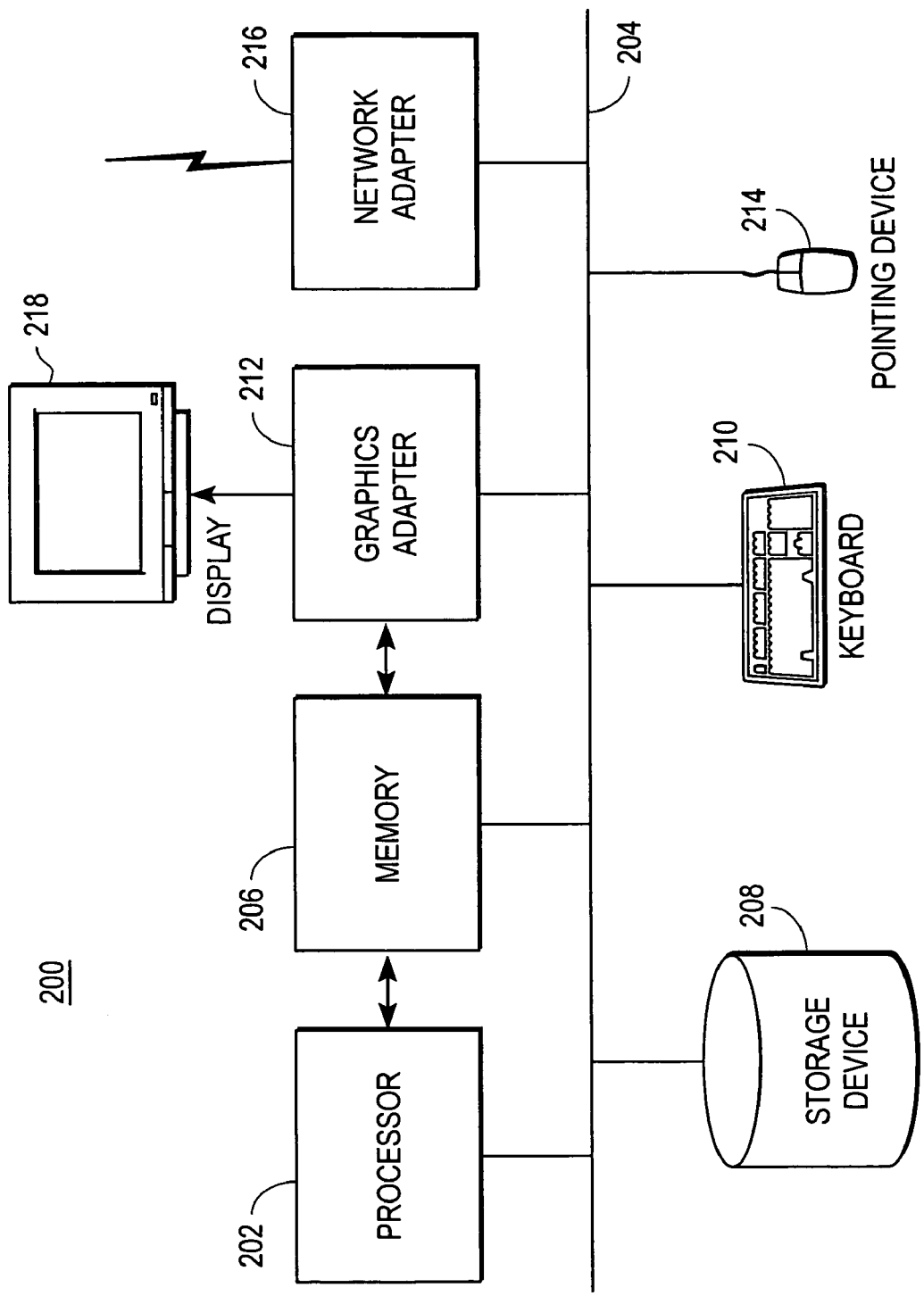
FIG. 2 is a high-level block diagram showing a computer system for acting as a security server and/or a client computer.

FIG. 2 is a high-level block diagram showing a computer system 200 for acting as a security server 112 and/or a client computer 114 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. Computer systems acting in different roles may have different and/or additional elements than the ones shown in FIG. 2. For example, a computer system 200 acting as a security server 112 may have greater processing power and a larger storage device than a computer system acting as a client computer 114. Likewise, a computer system acting as a security server 112 may lack devices such as a display 218 and/or keyboard 210 that are not necessarily required to operate it.

The processor 202 is a general-purpose processor such as an INTEL x86, SUN MICROSYSTEMS SPARC, or POWERPC compatible-CPU. The memory 206 is, for example, firmware, read-only memory (ROM), non-volatile random access memory (NVRAM), and/or RAM, and holds instructions and data used by the processor 202. The pointing device 214 is a mouse, track ball, pressure sensitive pad or other type of pointing device, and is used in combination with the keyboard 210 to input data into the computer system 200. The graphics adapter 212 displays images and other information on the display 218. The network adapter 216 couples the computer system 200 to the network 110. The storage device 208 is a hard disk drive and/or another device capable of storing data, such as a solid-state memory device.

As is known in the art, the computer system 200 is adapted to execute computer program modules. As used herein, the term "module" refers to computer program logic for providing the specified functionality. A module can be implemented in hardware, firmware, and/or software. This description occasionally omits the term "module." For example, the firewall module 116 is referred to as a "firewall." In one embodiment, the modules are stored on the storage device 208 as files. When utilized, the modules are loaded into the memory 206 and executed by the processor 202.

Figure 3:
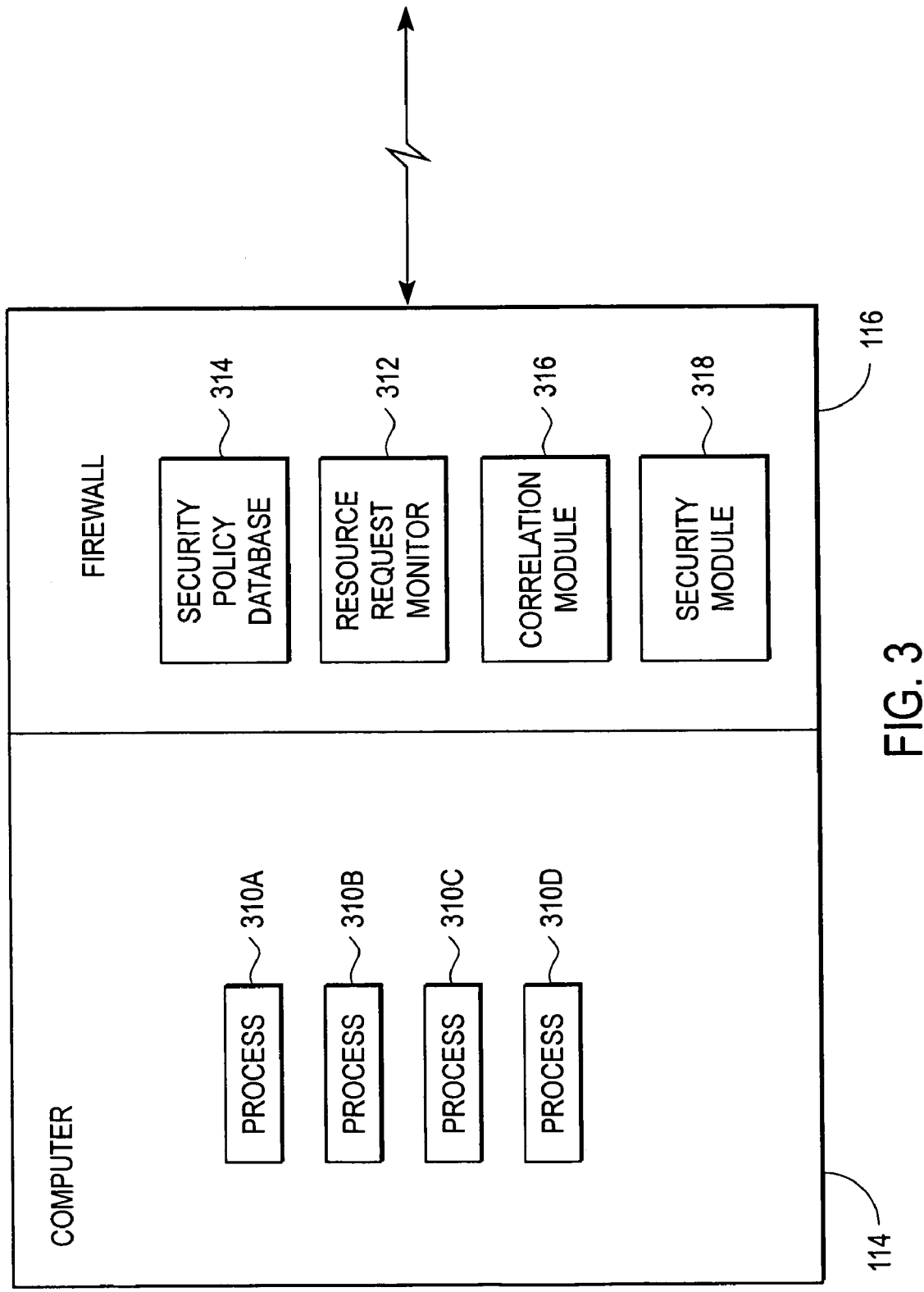
FIG. 3 is a high-level block diagram illustrating processes and modules within the client computer.

FIG. 3 is a high-level block diagram illustrating processes and modules within the client computer 114 according to one embodiment. Those of skill in the art will understand that other embodiments of the client computer 114 can have different and/or other modules than the ones described herein. In addition, the functionalities can be distributed among the modules in a manner different than described herein.

FIG. 3 illustrates four processes 310A-D executing on the client computer 114. These processes 310 represent the multiple processes that might be running at any given instant on the computer 114. These processes 114 can include processes spawned as part of the operating system and/or as parts of application programs. For example, an illustrated process 310 can represent a component of the operating system, a word processing program, an email program, and instant messaging program, a web browser, etc. For the most part, each process has a corresponding file on the storage device 208 that holds the instructions and data for that process.

FIG. 3 also illustrates the firewall 116 which, in this embodiment, is a module executing on the computer 114. In the illustrated embodiment, the firewall 116 includes numerous modules within it, including a resource request monitor module 312. The resource request monitor 312 monitors requests for network and/or other computer resources made by the processes 310. A request for network resources can include a request to send outbound traffic and/or a request to receive inbound traffic. Similarly, a request for other computer resources can include a request to access a file stored on the computer 114, a request to interact with another process 310, etc. In one embodiment, the resource request monitor 312 monitors traffic exchanged with the network 110. The monitored traffic includes outbound traffic sent from the computer 114 to the network 110, and inbound traffic received from the network. The outbound traffic is sent by a process 310 executing on the computer 110. The inbound traffic can be sent in response to outbound traffic, or independent of any outbound traffic.

In one embodiment, the resource request monitor 312 can determine which process 310 on the computer 114 is making a request to utilize network and/or other computer resources. The resource request monitor 312 collects information about the requesting process, such as its name and process ID (PID). In addition, the resource request monitor 312 collects information about the process in the computer's memory 206 and/or about the file stored on the storage device 208 that was executed to launch the process.

In one embodiment, the firewall 116 includes a security policy database 314 for storing security policies applicable for certain processes. In one embodiment, each security policy in the database 314 includes a (identifier, security rules) tuple, where the identifier serves to identify the at least one process 310 to which the policy pertains and the security rules are the rules that are applicable to the identified process. The security rules specify the rights of the process with respect to computer resources. In one embodiment, the security rules are firewall rules and describe the processes' rights with respect to network resources of the computer. For example, the security policy can identify a process 310 utilized by an instant messaging program and specify that the process is entitled to send and receive network traffic over the network ports and/or using the network protocols required to provide instant messaging. In this example, the security policy also specifies that the process 310 is not entitled to use ports and/or protocols that are not required to conduct instant messaging.

As mentioned above, in one embodiment the security provider prepares security policies for popular and/or common processes. These security policies are stored on the security server 112 and from there are downloaded by the client computers 114. These security policies are stored in the security policy database 314. In one embodiment, the security policy database 314 receives security policies through other means, such as via removable media installed in the computer 114 and/or through manual input by an end-user.

In one embodiment, a correlation module 316 determines whether a process 310 requesting network or other computer resources has an associated security policy in the security policy database 314. The correlation module 316 receives information about a process 310 requesting network and/or other resources from the resource request monitor 312. The correlation module 316 generates an identifier of the requesting process, and compares this identifier with the identifiers of the security policies in the database 314. If the identifiers match, then the security rules of the matching security policy are used for the process.

In one embodiment, a security module 318 enforces security policies for the firewall 116. The security module 318 receives the security rules and the identity of the processes to which the rules pertain from the correlation module 316. The security module 318 interacts with the resource request monitor 312 and/or other modules on the client computer 114 to enforce the security rules against the processes 310. The security module 318 thus allows a process 310 to access network and/or other resources permitted by the security rules applicable to the process, but blocks access to resources not permitted by the rules.

Figure 4:
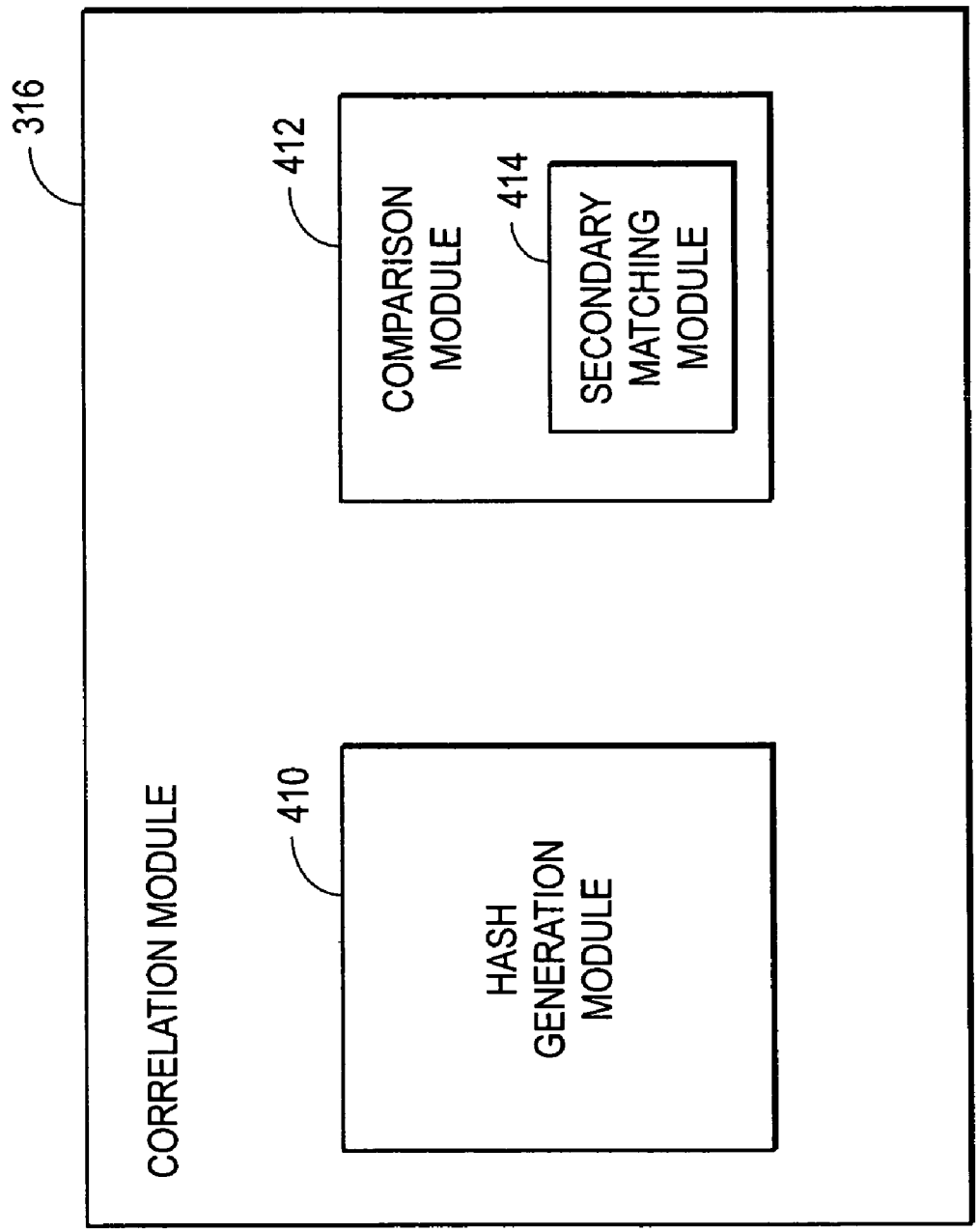
FIG. 4 is a high-level block diagram illustrating modules within the correlation module.

FIG. 4 is a high-level block diagram illustrating modules within the correlation module 316 according to one embodiment. A hash generation module 410 produces a hash by applying the intelligent hashing algorithm to the file and/or representation in memory 206 associated with the process 310 requesting the network and or other resources. In one embodiment, the security provider uses the same hashing algorithm on a version of the file known to be legitimate (i.e., not compromised by malicious software) and stores the resulting hash as the identifier of the process 310 in the security policy for that process. Thus, the hash produced by hash generation module 410 is the identifier used to match the process requesting resources with a security policy in the security policy database 314.

In one embodiment, the intelligent hashing algorithm used by both the hash generation module 410 and the security provider is the one described in U.S. patent application Ser. No. 10/211,827. The hashing algorithm has the property that a part of the hash of a file that is modified by a legitimate agent, such as by an upgrade or patch, does not change. Thus, the hash can be used to identify a process/file that has, or is likely to be, modified by a legitimate agent. In addition, the hashing algorithm has the property that a part of the hash of a file that is modified by a malicious agent, such as a virus or Trojan horse program, will change. Thus, the intelligent hashing algorithm can be used to detect whether a process/file has been changed by a malicious agent.

In one embodiment, the intelligent hashing algorithm generates two hashes based on a single input file. The first hash is called the "version hash" and is based on the components of the file that typically do not change when the file is modified by a legitimate agent. In an embodiment where the files are in the Windows Portable Executable (PE) format, the version hash is derived from the resource section of the file. The resource section contains data like strings, bitmaps, and dialogs that often do not change when a file is patched.

The second hash is called the "code hash" and is based on the portions of code within the file that are likely to be modified by a virus and/or other malicious agent. The code hash is based on the portions of the PE file that contain entry points and are likely to be used as hooks by malicious software. In one embodiment, these portions are the first and last 4K of the code section of the file.

In one embodiment, a comparison module 412 compares the output of the hash generation module 410 with the identifiers of the security policies stored in the security policy database 314 and detects any matches. In one embodiment, the comparison module 412 uses the version hash from the hash generation module 410 as the key into the database 314. That is, the comparison module 412 determines whether the version hash output by the hash generation module 410 matches a version hash used as an identifier by a security policy in the database 314. If a version hash match is found, the comparison module 412 also checks the code hash of the security policy to determine whether it matches.

There are thus three possible outcomes of the comparison performed by the comparison module 412: 1) both the version hash and code hash match; 2) the version hash matches but the code hash does not; or 3) the version hash does not match any security policies in the database 314. In one embodiment, if both the version hash and the code hash match, there is a high level of certainty that the process 310 requesting computer resources is the process referenced by the security policy in the database 314. Accordingly, in one embodiment the comparison module 412 (or another module executing on the client computer 114) provides the security rules in the security policy to the security module 318.

If the version hash matches but the code hash does not match, then it is likely that the process 310 requesting computer resources was modified by a malicious agent. In one embodiment, in the event of a code hash mismatch, the comparison module 412 declares that the process 310 is possibly malicious and performs an integrity check of the process 310. The integrity check can include initiating a virus scan of the process 310, determining whether the process is digitally signed by a legitimate entity, providing a dialog box warning the end-user of the risks associated with the process, etc. The actions can be performed by the comparison module 412 and/or by another module executing on the client computer 114. In one embodiment, the comparison module 412 provides the end-user with the option of using the security rules in the security policy having the matching version hash, or using a set of more restrictive rules designed for possibly-malicious software.

If the version hash does not match any security policies in the database 314, then in one embodiment a secondary matching module 414 performs secondary checks in an attempt to match the process 310 requesting computer resources with a security policy in the database 314. These secondary checks are generally less reliable than the hashes but are still useful. One secondary check examines the fields in the requesting process's version resource area (an area of Windows PE files) to gather information such the company name and/or product description. Another secondary check determines the name and/or size of the file associated with the requesting process. The secondary matching module 414 compares the information gathered through the secondary checks with information stored in the database 314 to detect any likely matching security policy. If there is a match, the comparison module 412 (or another module executing on the client computer 114) provides the rules in the security policy to the security module 318. If the secondary matching module 414 cannot find a match, in one embodiment it provides a dialog box to the end-user requesting input.

Figure 5:
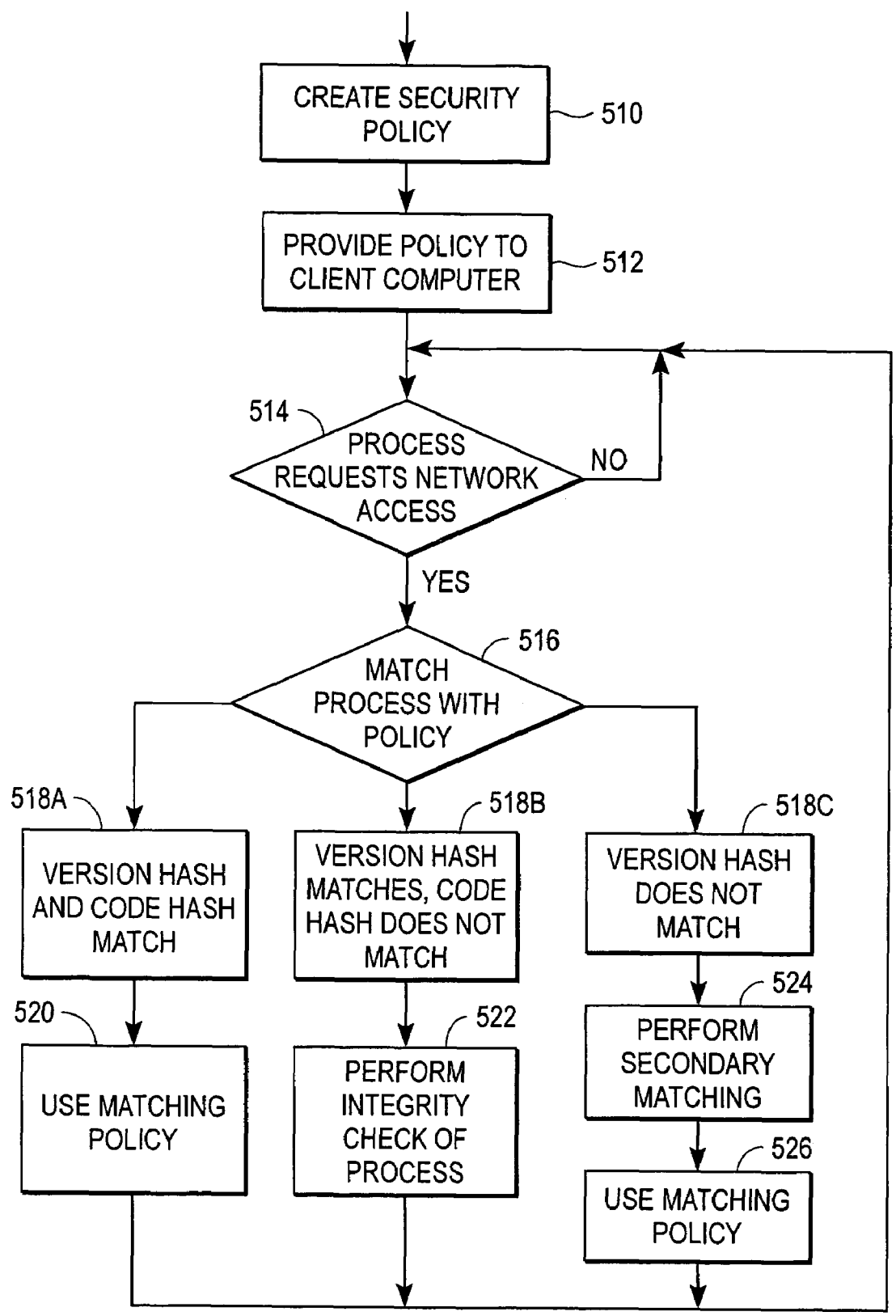
FIG. 5 is a flow chart showing steps performed by the firewall and other entities.

FIG. 5 is a flow chart showing steps performed by the firewall 116 and other entities according to one embodiment. Not every possible step is shown in the figure. In addition, some embodiments perform different steps in addition to, or instead of, the ones described herein. Furthermore, the order of the steps can vary from that described herein.

The security provider creates 510 one or more security policies for processes of given software applications. Each security policy in one embodiment includes a process identifier having a version hash and a code hash, and a set of security rules for use with its corresponding process. The security provider uses the security server 112 or another technique to provide 512 the security policies to a client computer 114.

A firewall 116 executing on the client computer 114 detects 514 that a process 310 is requesting access to network and/or other computer resources. In response, the personal firewall 116 generates version and code hashes for the requesting process and attempts to match 516 the version hash with the version hash of a security policy. In one embodiment, there are three possible outcomes 518 to the attempted match: both the version hash and code hash match 518A, only the version hash matches 518B, or the version hash does not match 518C. If both the version and core hashes match 518A, the personal firewall 116 applies 520 the security rules in the matching security policy to the process. If only the version hash matches 518B, the personal firewall 116 declares that the process 310 is possibly malicious and performs an integrity check of the process. If the version hash does not match any security policy 518C, the personal firewall 116 performs 524 secondary matching find a matching policy. The personal firewall 116 applies 526 the matching policy, if any, to the requesting process 310.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer program product having a computer-readable storage medium having computer program instructions encoded therein for protecting a computer, the computer program instructions comprising:
 a security policy database module adapted to store a plurality of security policies, a security policy including a version hash and a code hash that identify a process to which the security policy pertains and a set of security rules applicable to the process, wherein the version hash is adapted to be unchanged responsive to the process being modified by a legitimate agent;
 a correlation module for generating a version hash and a code hash of a process on the computer and determining whether the generated version hash and the generated code hash match the version hash and the code hash of the security policy in the security policy database; and
 a security module for enforcing the security rules of the security policy having the matching version hash and the matching code hash against the process.

2. The computer program product of claim 1, wherein the security rules include firewall rules describing rights of the process with respect to network resources.

3. The computer program product of claim 1, wherein the code hash is adapted to change if the process is modified by a malicious agent.

4. The computer program product of claim 1, wherein, responsive to the generated version hash matching the version hash of the security policy in the security policy database, the correlation module is adapted to determine whether the generated code hash matches the code hash of the security policy in the security policy database.

5. The computer program of claim 4, wherein, responsive to the generated code hash not matching the code hash of the security policy in the security policy database, the correlation module is adapted to declare that the process is possibly malicious.

6. The computer program of claim 4, wherein, responsive to the generated code hash not matching the code hash of the security policy in the security policy database, the correlation module is adapted to initiate an integrity check of the process.

7. The computer program product of claim 1, wherein, responsive to the generated version hash not matching a version hash of any security policy in the security policy database, the correlation module is adapted to use secondary characteristics of the process to match the process with the security policy in the security policy database.

8. A system for protecting a computer, comprising:
a computer processor; and
a computer-readable storage medium storing computer program modules configured to execute on the computer processor, the computer program modules comprising:
a security policy database module adapted to store a plurality of security policies, a security policy including a version hash and a code hash that identify a process to which the security policy pertains and a set of security rules applicable to the process, wherein the version hash is adapted to be unchanged responsive to the process being modified by a legitimate agent;
a correlation module for generating a version hash and a code hash of a process on the computer and determining whether the generated version hash and the generated code hash match matches the version hash and the code hash of the security policy in the security policy database; and
a security module for enforcing the security rules of the security policy having the matching version hash and the matching code hash against the process.

9. The system of claim 8, wherein the security rules include firewall rules describing rights of the process with respect to network resources.

10. The system of claim 8, wherein the code hash is adapted to change if the process is modified by a malicious agent.

11. The system of claim 8, wherein, responsive to the generated version hash matching the version hash of the security policy in the security policy database, the correlation module is adapted to determine whether the generated code hash matches the code hash of the security policy in the security policy database.

12. The system of claim 11, wherein, responsive to the generated code hash not matching the code hash of the security policy in the security policy database, the correlation module is adapted to declare that the process is possibly malicious.

13. The system of claim 11, wherein, responsive to the generated code hash not matching the code hash of the security policy in the security policy database, the correlation module is adapted to initiate an integrity check of the process.

14. The system of claim 8, wherein, responsive to the generated version hash not matching a version hash of any security policy in the security policy database, the correlation module is adapted to use secondary characteristics of the process to match the process with the security policy in the security policy database.

15. A method for providing security rules to a client computer, comprising:
generating a version hash and a code hash that identify a process, the version hash adapted to be unchanged if the process is altered by a legitimate agent;
generating a set of security rules applicable to the process;
providing the version hash, the code hash, and the set of security rules to the client computer,
wherein the client computer is adapted to generate a client version hash and a client code hash of a process executing on the client computer and is further adapted to apply the security rules to the process executing on the client computer a responsive to the client version hash having a matching the provided version hash and the client code hash matching the provided code hash.

16. The method of claim 15, wherein the security rules include firewall rules describing rights of the process with respect to network resources.

17. The method of claim 15, wherein the code hash is adapted to change if the process is modified by a malicious agent.

* * * * *

UNITED STATES PATENT AND TRADEMARK OFFICE
CERTIFICATE OF CORRECTION

PATENT NO. : 7,496,956 B1
APPLICATION NO. : 11/030390
DATED : February 24, 2009
INVENTOR(S) : Pieter Viljoen and Gregory D. Vogel It is certified that error appears in the above-identified patent and that said Letters Patent is hereby corrected as shown below:

Column 9, line 29, Claim 8, after "match" delete "matches".
Column 10, line 32, Claim 15, after "compute" delete "a".
Column 10, line 32, Claim 15, after "hash" delete "having".
Column 10, line 33, Claim 15, before "matching" delete "a".

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,496,956 B1
APPLICATION NO.    : 11/030390
DATED              : February 24, 2009
INVENTOR(S)        : Pieter Viljoen and Gregory D. Vogel It is certified that error appears in the above-identified patent and that said Letters Patent is hereby corrected as shown below:

Column 9, line 29, Claim 8, after "match" delete "matches".
Column 10, line 32, Claim 15, after "computer" delete "a".
Column 10, line 32, Claim 15, after "hash" delete "having".
Column 10, line 33, Claim 15, before "matching" delete "a".

This certificate supersedes the Certificate of Correction issued April 14, 2009.

Signed and Sealed this

Sixteenth Day of June, 2009

JOHN DOLL
*Acting Director of the United States Patent and Trademark Office*